United States Patent

Barr

[15] 3,636,791
[45] Jan. 25, 1972

[54] GEAR OR RACK CONSTRUCTION

[72] Inventor: William A. Barr, Milwaukee, Wis.
[73] Assignee: Milwaukee Gear Company, Milwaukee, Wis.
[22] Filed: Feb. 11, 1970
[21] Appl. No.: 10,483

Related U.S. Application Data

[63] Continuation-in-part of Ser. No. 40, Jan. 2, 1970, abandoned.

[52] U.S. Cl. .................................................74/422, 74/462
[51] Int. Cl. .................................F16h 1/04, F16h 55/06
[58] Field of Search ..................29/159.2; 74/422, 439, 462, 74/457, 437

[56] References Cited

UNITED STATES PATENTS

| | | | |
|---|---|---|---|
| 3,504,565 | 4/1970 | Lichtenauer et al. | 74/462 X |
| 2,869,389 | 1/1959 | Proefke | 74/462 |
| 3,043,158 | 7/1962 | Herr, Jr. | 74/462 |
| 3,192,786 | 7/1965 | Stott | 74/462 X |

*Primary Examiner*—Leonard H. Gerin
*Attorney*—Thomas O. Kloehn and Allan W. Leiser

[57] ABSTRACT

A long rack to be engaged by a drive pinion of a gantry crane is made up of an assembly of segments mounted end-to-end. Each segment consists of two rack portions flame cut from a single blank and adhesively joined side-by-side with the respective teeth portions aligned. The teeth portions are tapered in thickness and joined at their narrow ends to make composite teeth with concave faces.

9 Claims, 5 Drawing Figures

PATENTED JAN 25 1972 3,636,791

INVENTOR
WILLIAM A. BARR

BY Thomas O. Koehn

ATTORNEY

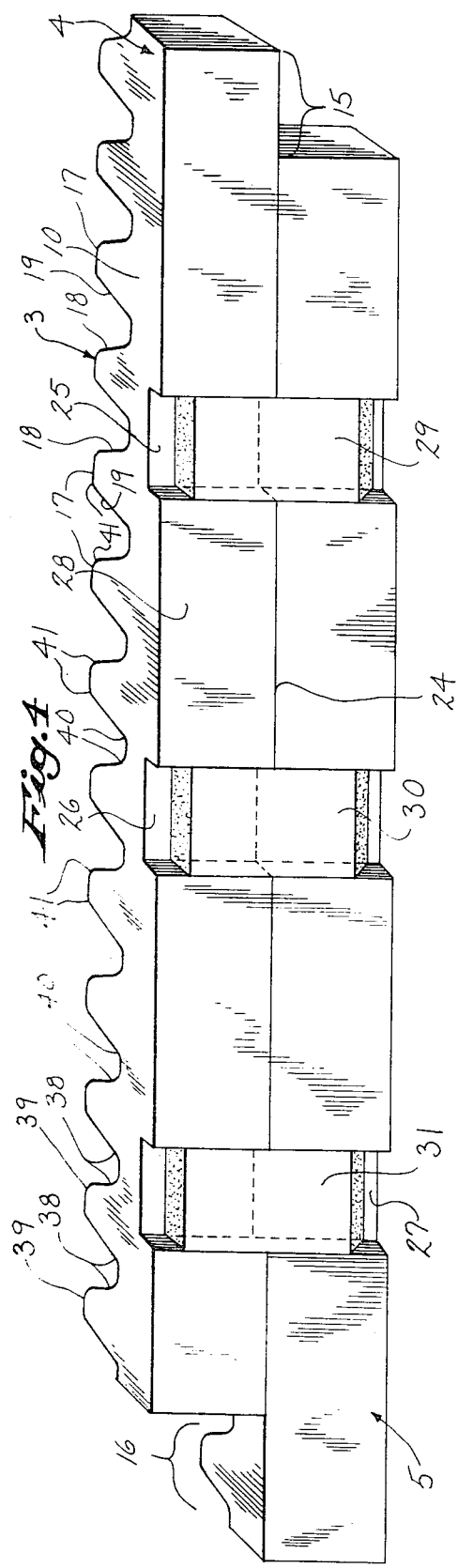
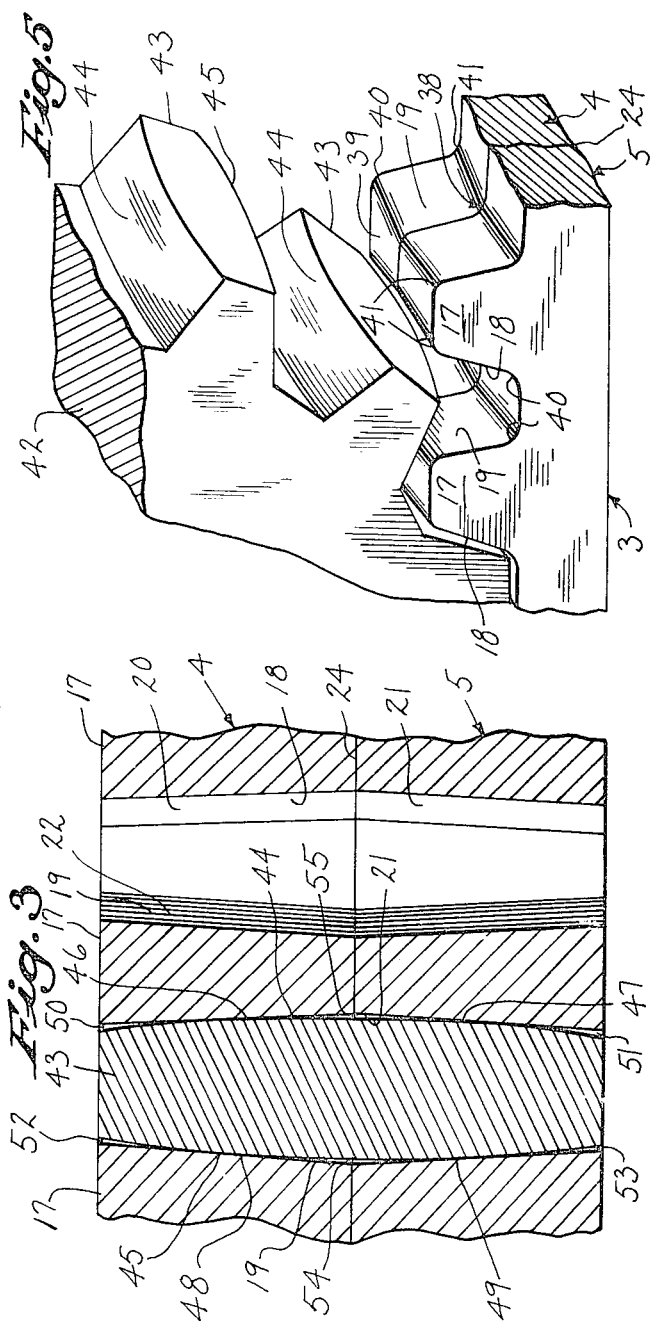
INVENTOR
WILLIAM A. BARR
BY
ATTORNEY

GEAR OR RACK CONSTRUCTION

RELATED APPLICATIONS

This is a continuation-in-part of the pending application of the same inventor, entitled "Gear or Rack Construction," Ser. No. 40, filed on Jan. 2, 1970 now abandoned.

BACKGROUND OF THE INVENTION

A gantry crane for use in loading and unloading an ocean going vessel was designed for this purpose to travel the length of the ship, some 600 feet, and it required a rack and pinion drive to obtain the most reliable and practical, positive drive and control. However, a rack for such use made by conventional machining or casting techniques would be excessively costly, and the rack tooth width required seemed to preclude known flame-cutting techniques. A new practical rack-making technique was required to meet this need.

In addition to the manufacturing problems generated by the sizes of racks required, extraordinary loading and tolerance specifications had to be met. Due to inherent flexibility in the structure of the ship and other limitations imposed on the mounting of the rack an angle tolerance between the rack and drive pinion of +3° was specified and a center distance variation of about ½ inch was anticipated. Such specifications in this high-torque application require a gear tooth design that can withstand extremely severe load concentration, and such a requirement is usually met by scaling up the size of the system and especially treating selected steels from which the gears and racks are made. Manifestly there are practical limits both as to the sizes that can be used and as to material characteristics that can be achieved. To avoid exceeding such practical limits a new gear design is needed.

SUMMARY OF THE INVENTION

The present invention relates to a method of manufacturing dentate members and more particularly the invention resides in the steps of flame cutting a plurality of substantially identical dentate portions from gear material so that each dentate portion has a dentate profile of a plurality of spaced-apart gear teeth desired for the completed dentate member, assembling the plurality of dentate portions side-by-side with the gear teeth in alignment and securing the dentate portions together into a rigid unitary structure. The present invention also relates to a structure for a dentate member, and more particularly the invention resides in a dentate member that is made up of a plurality of substantially identical dentate portions secured together in side-by-side relationship with the tooth portions of the dentate portions in alignment, the tooth portions having a profile with a rounded fillet at its roots and rounded corners at its peak such that the radii of the corners and fillets are constant regardless of the number of teeth and a fixed function of each other. The present invention also relates to a tooth configuration for a dentate member, and more particularly the invention resides in a gear tooth with concave faces, each face having two centrally converging facets.

A multitude of advantages flow from the invention set forth in the preceding paragraph. The process is unparalleled in economy throughout a large range of applications. Moreover the process produces no chip and utilizes minimum amount of material. The process is also very versatile and flexible. Present machining processes limit the pitch of a dentate member that can be made on existing equipment. By contrast, process of the present invention may be considered, for practical purposes, unlimited, not only in the pitch but in most other aspects of tooth geometry and configuration. By laminating a plurality of dentate portions together previous limitations in face width are substantially removed.

The flame cut laminated product set forth above also has several inherent advantages. For example, this product can have an optimum root fillet and peak corner radii for any size or configuration. The root fillet is important because the tension and compression forces from tooth deflection are focused at the roof of the tooth and tend to generate fatigue failures at the root of the tooth. Hence strengthening of the tooth at the root is often required for optimum fatigue life. The peak corner radius is likewise important to avoid gear tooth interference while preserving the maximum working face height. In the prior art machining techniques, these radii are determined in part by the number of teeth on a gear, but this is not a factor in a flame cut product. Also, the flame cut product is automatically surface hardened in a superior fashion. Surface hardening of the dentate member produces a secondary hardness transition between the hardened surface layer and the relatively softer core metal on the inside of the dentate member. Conventional surface hardening is performed after the dentate member is shaped and the line of secondary hardness transition tends to surface at the roots of the teeth lending a preferential fatigue line to what is already one of the most vulnerable areas of the tooth. By contrast, a flame cut tooth is surface hardened by its process of manufacture and has a secondary hardness transition that is uniformly spaced from the outside profile of the dentate member throughout the entire profile, and this allowed the dentate member to be designed with less tooth thickness, particularly at the root area, then had been possible with conventional surface hardened dentate members.

In addition to the foregoing, the concave tooth face resulting from the lamination of two dentate portions produces, by virtue of the resulting tooth configuration, certain advantages that are inherent in that configuration whether the dentate member is flame cut or manufactured by other techniques. The concave tooth with its two areas of contact, one on each facet, avoids tooth end impingement and overloading because it necessarily achieves a dispersion of loading. The converging facets also achieve a cancellation of end thrust which otherwise results from a tapered tooth face. This tooth configuration has additional important advantages in that it aids the work-in of a gear system by providing a cradling action for the teeth of the mating dentate member. While this advantageous work-in function manifests itself in rigid gear systems, it is even more important in systems which employ adjustable or flexibly mounted dentate members.

The flexibly or adjustably mounted mating dentate member will be urged into proper meshing engagement with the dentate member of the present invention by virtue of its normal cradling function.

BRIEF DESCRIPTION OF THE DRAWINGS

In the drawings:

FIG. 3 is a plan view in section of a portion of the rack embodying the present invention in mesh with one tooth of a mating pinion, FIG. 4 is a rear view in perspective of a rack segment embodying the present invention, and FIG. 5 is a partial view in perspective of a pinion engaging a rack embodying the present invention.

DETAILED DESCRIPTION

Figure 1:
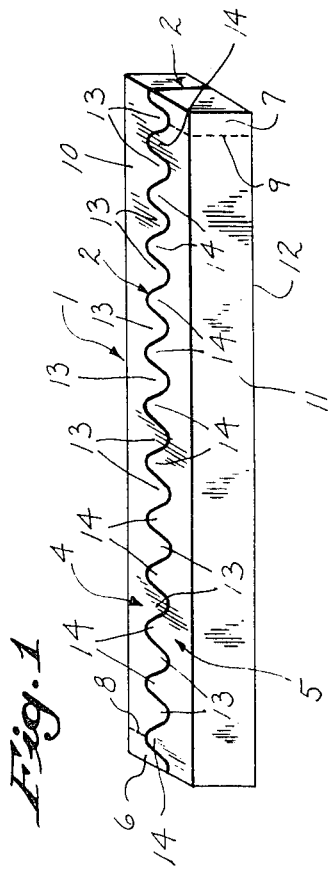
FIG. 1 is a view in perspective of a blank of gear material from which rack portions have been cut.

FIG. 1 illustrates a blank 1 of gear material, which in this embodiment is a rectangular block of steel approximately 3½ inches thick, 6 inches wide and between 39 and 40 inches long. A kerf 2 is flame-cut through the length of the blank 1 in a path that is the desired profile of the completed dentate member, which in this case is a rack segment 3. Since the pitch line (not indicated in the drawing) of the rack profile is centered in the width of the blank 1, the kerf 2 has generated two, identical, mirror image dentate portions 4 and 5. Each of the dentate portions 4 and 5 terminates at one end in a half-tooth 6 and 7, respectively, which will be cut off along the dotted lines 8 and 9, respectively, and discarded. In the view illustrated in FIG. 1, a top surface 10 of the blank 1 is shown, as well as a side surface 11, which becomes a back surface 11 of the dentate portion 5. A bottom surface 12 of the blank 1 appears in FIGS. 2, 4 and 5 as side surfaces of dentate portions 4 and 5. The oxygen-gas flame (not shown) which forms the kerf 2 enters the blank 1 at the top surface creating the kerf 2 of a width of about 0.100 inches at the top surface, and the flame (not shown) extends toward the bottom surface 12 where the kerf is approximately 0.107 inches wide.

At this point the term "flame-cut" used throughout this disclosure and in the claims that follow it requires definition. The use of a stream of oxygen molecules heated by burning acetylene or other gases to cut steel has long been known and because of its convenient availability it is applied in the preferred embodiment of the invention disclosed here. However, there are a number of other techniques which depend on either the thermal softening, melting or evaporation of a workpiece which either are not well enough developed technologically or are not conveniently available at this time that are predictably applicable in carrying out the present invention for the same reasons that the flame-cutting technique works so well. Examples of these various techniques include electrical sparking, which is also known as electrical discharge machining, electron beam cutting, laser beam devices, the plasma torch, etc. At the present time there is no accepted generic term that covers all of these devices having the indicated common characteristics. Accordingly the term "flame cutting" and its cognates is selected for the purposes of this specification inasmuch as that is the specific form employed in the embodiment shown, but each use of that term is intended to include also the entire family of techniques which depend upon the thermal softening, melting or evaporation of the workpiece for the cutting of the workpiece.

After the dentate portions 4 and 5 have been flame cut from the blank 1 and the half teeth 6 and 7 removed, the dentate portions 4 and 5 are assembled together in side-by-side relationship with their teeth portions 13 and 14 in alignment, but offset from each other by one pitch length. Thus a pitch 15 length of the dentate portion 4 extends beyond one end of the dentate portion 5, and correspondingly a pitch length 16 of the dentate portion 5 extends beyond the opposite end of the other dentate portion 4 producing an offset relationship. This offset assembly of the rack portions 4 and 5 facilitates the end-to-end mounting of the rack segments 3 so as to ensure uniformly good mesh with a mating gear throughout the length of a rack made of plurality of segments 3. By cutting off the half teeth 6 and 7 and using a full pitch length 15 and 16 overlap maximum rack tooth strength is ensured.

The dentate portions 4 and 5 are assembled so that their side surfaces which had been the bottom surface 12 of the blank 1 are in adjacent abutting relationship. Hence, the narrowest ends of the teeth portion 12 and 13 created by the expanding kerf 2 are adjacent to one another. By placing the narrowest end of the tooth portions 13 and 14 together, each composite tooth 17 of the rack segment 3 has two faces 18 and 19, each consisting of two centrally converging facets 20, 21 and 22, 23, respectively, to give it a generally concave configuration. The dentate portions 4 and 5, thus arranged, are cemented together using a synthetic adhesive, which in this embodiment is commercially procured epoxy resin 24. Three channels 25, 26 and 27 are cut across the back surface 28 of the rack segment 3 and in each a steel shear plate 29, 30 and 31, respectively, is snugly fitted and welded into position. Subsequently, the shear plates 29–31 may be drilled and tapped or otherwise fitted with means for holding the rack segment 3 for positioning and mounting it.

Figure 2:
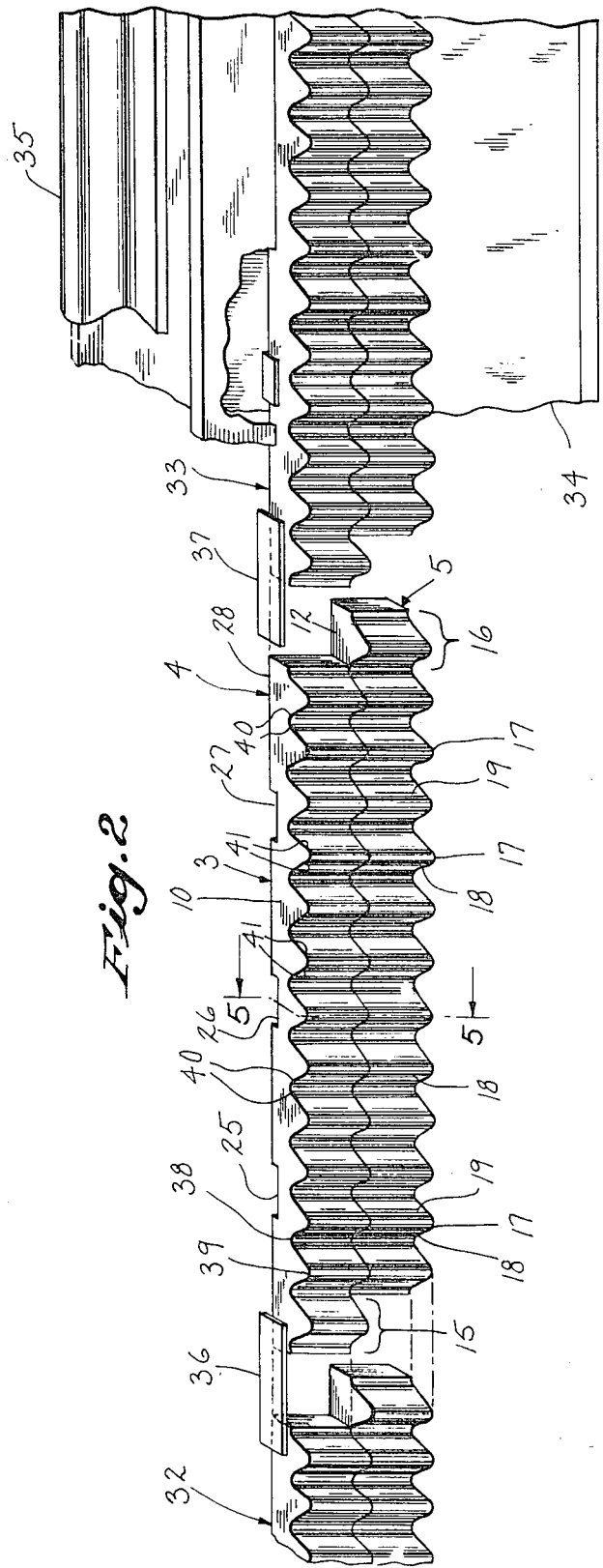
FIG. 2 is a view in perspective, partially exploded, of a portion of a rack embodying the present invention.

The rack segment 3 is then mounted in end-to-end relationship with other, identical rack segments 32 and 33, as is shown in FIG. 2, so that their overlapping pitch lengths mate with one another and the overlapping tooth portions are in alignment (in FIG. 1 the end-to-end mounting is shown in exploded view where the overlapping tooth portions are not in alignment so as to illustrate the manner in which the segments 3, 32 and 33 are mounted to make a completed rack). The rack segments 3, 32 and 33 are mounted on a vertical web 34 of a structural member that support a rail 35 on which a gantry crane (not shown) rides. The assembled rack segments are welded to the web 34 and to steel tie plates 36 and 37 which span the end joints between the adjacent rack segments 3, 32 and 33.

Several unique aspects of tooth design and configuration are achieved. Each of the tooth portions 13 and 14 has a root 38 and a peak 39. A rounded fillet 40 is formed at the root 38 on each side of each of the tooth portions 13 and 14, and hence of the composite tooth 17. As mentioned above, the teeth 17 when in driving engagement with a mating member are inevitably deflected to some extent and this deflection is focused in the form of compression at one side of the root 38 and tension at the opposite side of the root 38 of the tooth 17 under load. If the tooth is overloaded, it may break at the root 38, but more commonly fatigue cracks develop at the root 38. Accordingly, the roots 38 are strengthened by the addition of the fillets 40, the radii of which are carefully calculated dimensions of the tooth design.

At the peak 39 of the tooth portions 13 and 14, and thus of a composite tooth 17, rounded corners 41 are formed, and this configuration is well known in the art as a device to avoid tooth interference between mating members under load. The mentioned deflection of the loaded teeth of gear members in mesh tends to cause an impingement of converging teeth at the initial meeting of the unloaded teeth, and this phenomena is referred to as tooth interference. Ideally, the peak corners would be square so as to obtain maximum utilization of the entire height of the tooth face, but square corners also increase the likelihood of tooth interference, so the rounded corners 41 are formed. Gear teeth portions 13 and 14 made according to the present invention form the rounded corners 41 and the rounded fillets 40 simultaneously as the kerf 2 is cut in the blank 1, but note that the rounded fillets 40 are always at the outside radius of the curvature of the kerf 2 while the rounded corners 41 are always on the inside of the radius of curvature. As a result, the radius of curvature of the fillet 40 in this embodiment is approximately 0.10 of an inch greater than the radius of curvature of the rounded corners 41, which produces optimum radii of curvature at each point. By expanding or contracting the kerf 2 the relationship between the radii of the fillet 40 and rounded corners 41 can be varied. In any case, the radii of the fillets 40 and of the rounded corners 41 are functions of one another in a dentate structure made according to the present invention. Also, employing conventional machining techniques, the radii of curvature of the fillets 40 and rounded corners 41 will vary depending upon the number of teeth in a gear, thus limiting the design of the gear teeth, but there is no limitation to the design of dentate members made according to the present invention.

A second aspect of the tooth configuration achieved by the present invention is the development of the generally concave faces 18 and 19 of the composite teeth 17. In FIG. 5, a portion of a pinion 42 is shown in driving engagement with a part of the rack segment 3. The pinion 42 has involute teeth 43 with convex or crowned faces 44 and 45 on each side. One such pinion tooth 43 is shown in section between a pair of rack teeth 17 in FIG. 3. The crowned faces 44 and 45 can be seen engaging adjacent concave faces 18 and 19, respectively, of the rack 3 at two areas of contact 46, 47 and 48, 49, respectively. At the edges of the teeth there is no engagement as evidenced by the spaces 50, 51, 52 and 53, and similarly at the center of the teeth there are spaces 54 and 55 evidencing no tooth contact. While the dimensions of the concavities of the faces 18 and 19 of the rack teeth 17 are manifestly exaggerated to illustrate the functional relationships with the crowned faces 44 and 45 of the pinion 42 teeth 43, that essential operation prevails nevertheless with the actual dimensions. First it should be noted that the creation of two contact areas 46 and 47 or 48 and 49 under load (depending on the direction of the loading) serves to distribute the loading across the pinion teeth 43 and the rack teeth 17 and this allows the teeth 43 and 17 to be designed for substantially less thickness than would otherwise be required. Consequently, the loading at one or the other of the edges of the teeth, which is characteristic in the conventional gear teeth, does not and cannot occur in the relationship of the pinion 42 and rack 3 shown in FIGS. 3 and 5. This nesting or cradling effect which the concave faces 18 and 19 have on the crown-faced pinion teeth 43 not only aids work-in of a new, rigid system, but becomes extremely important in the system of the present embodiment which employs an adjustable pinion. Finally, much of the failure of gear teeth encountered results, not from the breaking off of the teeth, but from pitting of the surface of the gear teeth due to excessively heavy and concentrated loading. Hence the distribution of the loading has the additional effect of preserving the surface of both the pinion teeth 43 and the rack teeth 17 to reduce or, conceivably, eliminate this type of tooth failure.

Manifestly, the creation of concave tooth faces, such as the faces 18 and 19 on the composite teeth 17 of the rack segment 3, does not depend upon the specific method of making dentate members and specific laminated structure of dentate members disclosed herein as the preferred embodiment. Such a tooth face can also be made by machining or casting, for example. Also, although the drawings might suggest that only a tooth face concavity generated by two flat facets meeting at the center of the tooth face an implement the invention, such a configuration is not actually essential to obtaining two areas of contact. It is only essential that the radius of curvature of the crowned tooth, such as the pinion tooth 43, be shorter than the radius of curvature of the mating surface of the concave face, such as the facets 20-23 of the faces 18 and 19 of the composite tooth 17. The concave tooth may have many facets, none of which are flat, but what is needed is two facets located so as to cradle the mating crowned tooth and guide it to a position where it makes two areas of contact with the concave tooth, and to do this concave tooth must have a generally concave face on the side that is loaded and it must have two facets that converge toward the center to generate those two areas of contact.

A gear rack of laminated structure can be assembled so as to effect the tooth face concavity, even though the teeth portions of each of the rack portions to be laminated together are not tapered in thickness, but are perfectly uniform throughout. Also if the teeth portions are tapered, the effective concavity can be increased. This is accomplished by spreading the joint or joints between the two or more laminated portions along the back surface of the composite rack segment while holding the laminated portions relatively tightly together at the peaks of the teeth. The pitch line for the composite laminated rack segment will still be located straight across the faces of the rack teeth, but because of the spreading of the joint or joints toward the back surface of the rack, the pitch line appear closer to the roots of the teeth on the outsides and closer to the peaks of the teeth toward the center. Thus, in functional effect, the composite, laminated teeth will be thinner toward the center and thicker toward the outside of the width of the teeth and the teeth will have, in effect, concave faces.

The foregoing drawings and the description set forth the best mode presently contemplated by the inventor for carrying out his invention, and they describe the invention in the manner and process of making and using it in such full, clear, concise and exact terms as to enable any person skilled in the art to which it pertains, or with which it is mostly nearly connected, to make and use it. By contrast, the subject matter which the applicant regards as his invention is particularly pointed out and distinctly claimed in in the claims that follow.

I claim:

1. A dentate member for use in a gear mechanism to mesh with another dentate member having a parallel axis, the combination comprising:
   a dentate member having a plurality of spaced-apart teeth for force transmitting meshing engagement with another dentate member having a parallel axis;
   each of said spaced-apart teeth having a pair of concave faces on opposite sides of it and each of said pair of concave faces being created by at least two distinct nonparallel facets converging toward each other and the center of said face.

2. A dentate member for use in a gear mechanism as set forth in claim 1 wherein
   said dentate member is a gear rack.

3. A dentate member for use in gear mechanism as set forth in claim 1 wherein
   said other dentate member has a plurality of spaced-apart teeth with crowned faces shaped to engage each of said facets in a single contact area.

4. A dentate member for use in a gear mechanism as set forth in claim 1 wherein
   said dentate member is made of a plurality of substantially identical dentate members with spaced-apart teeth, secured together side-by-side with said spaced-apart teeth in alignment.

5. A dentate member of laminated construction for use in a gear mechanism comprising the combination of
   a plurality of substantially identical dentate portions, each of said dentate portions having a profile defining a plurality of spaced-apart teeth, each of said teeth having a peak;
   said dentate portions being assembled together in side-by-side relationship with said spaced-apart teeth in alignment;
   and said dentate portions being secured together by an adhesive between said dentate portions.

6. A dentate member as set forth in claim 5 wherein
   said unitary laminated dentate member has a plurality of spaced-apart teeth, each of said teeth having a pair of concave faces on opposite sides.

7. A dentate member as set forth in claim 6 wherein
   said concave faces are shaped to develop two areas of contact with teeth of a meshing gear.

8. A dentate member as set forth in claim 6 wherein
   said plurality dentate portions are gear rack portions and at least one of said gear rack portions is assembled to project at least one tooth beyond at end of another of said gear rack portions.

9. A gear rack comprising the combination of
   a plurality of gear rack segments mounted end to end;
   each of said plurality of gear rack segments being made up of at least two substantially identical gear rack portions with spaced-apart teeth fastened together in side-by-side relationship with said teeth in alignment and said two substantially identical gear rack portions being mounted so that one of said teeth of one of said gear rack portions extends beyond an end of the other gear rack portion;
   and said gear segments being mounted so that said one of said teeth of one segment overlap and align with said one of said teeth in a next adjacent gear rack segment.

* * * * *